Figure 1:
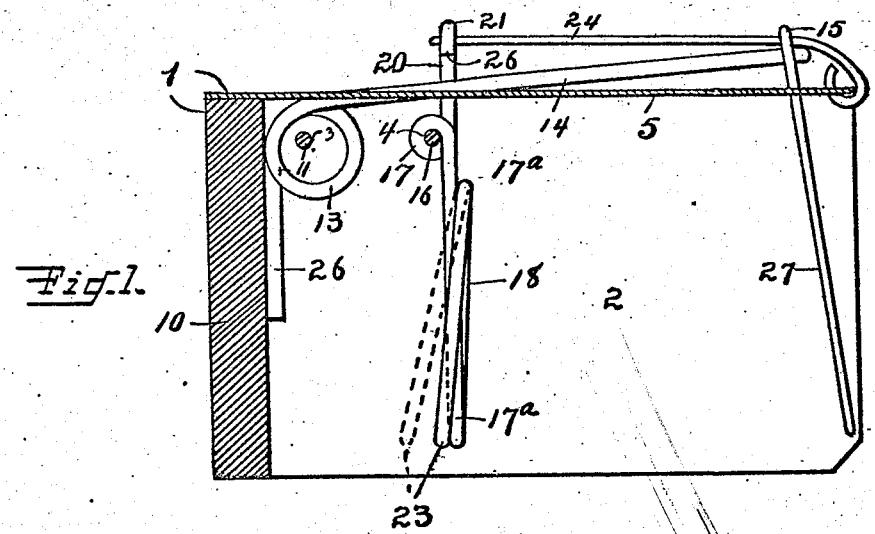

No. 895,017. PATENTED AUG. 4, 1908.
W. C. HOOKER.
ANIMAL TRAP.
APPLICATION FILED NOV. 30, 1907.

2 SHEETS—SHEET 1.

WITNESSES: INVENTOR:

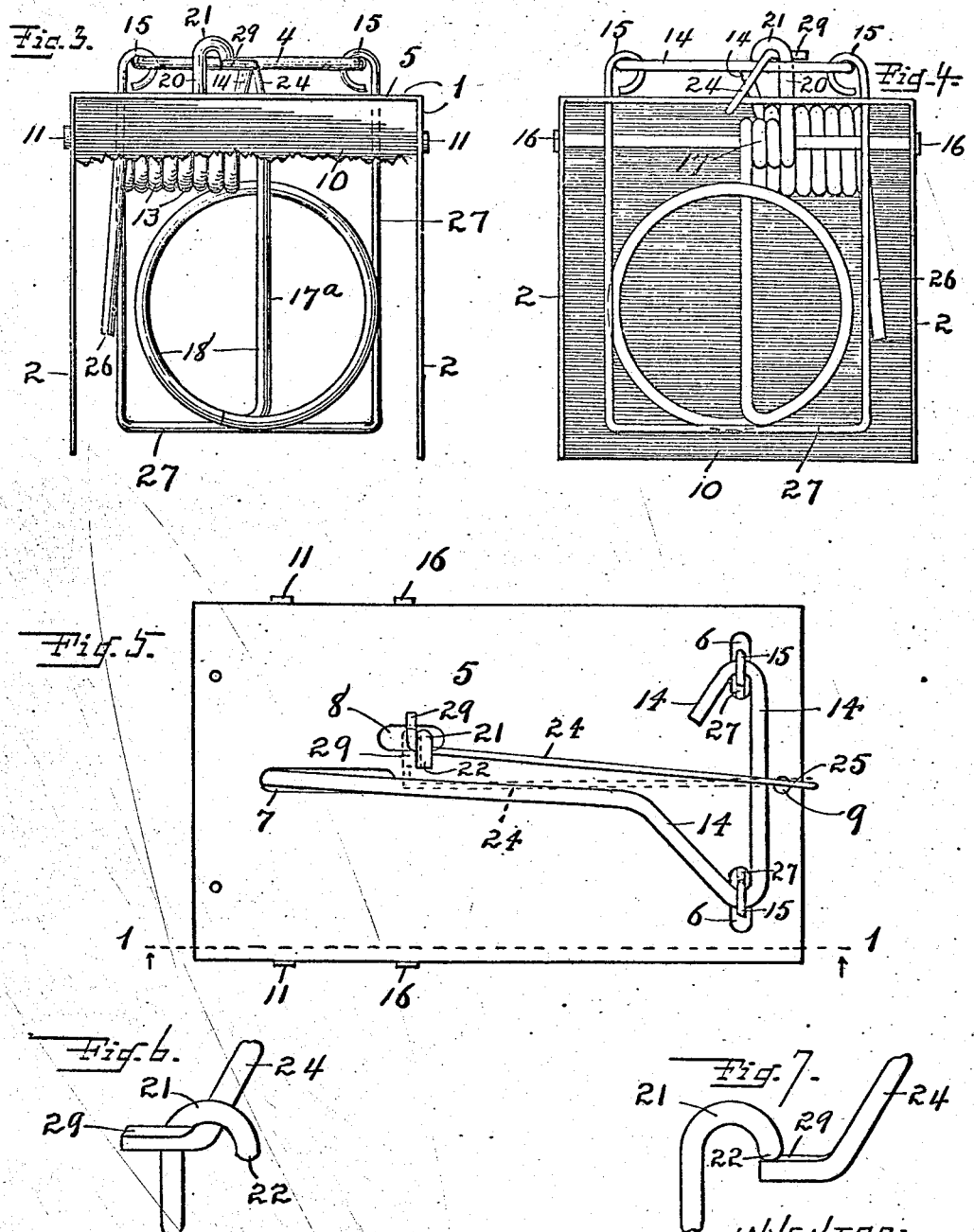

UNITED STATES PATENT OFFICE.

WILLIAM CHAUNCEY HOOKER, OF ABINGDON, ILLINOIS.

ANIMAL-TRAP.

No. 895,017.  Specification of Letters Patent.  Patented Aug. 4, 1908.

Application filed November 30, 1907. Serial No. 404,483.

*To all whom it may concern:*

Be it known that I, WILLIAM CHAUNCEY HOOKER, a citizen of the United States, and a resident of Abingdon, in the county of Knox and State of Illinois, have invented a new and useful Animal-Trap, of which the following is a specification.

My present invention has relation to a trap which is efficient when used as a trap for catching rats or other animals which infest houses, barns and other buildings, or when employed to catch gophers or like animals which burrow in or tunnel the ground.

A main object of the invention is to provide a device of the character described which will be sprung by an animal of the first recited class attempting to get the bait or lure from off the tripping lever, which he will do by tugging at or pulling on said lever to draw its depending member toward the open or forward end of the trap; and will be as readily sprung by an animal of the second recited class striking the lever with a small portion of compacted earth which he pushes forward in advance of himself as he attempts to leave his tunnel, the direction of movement of said lever being then contrary to that last described.

Another leading object of the invention is to provide means which constitutes a part of the trap recited but which may be incorporated in other types of like devices, which means forms a lock or safety-set, whereby, when the trap is set and certain parts thereof in relative positions which will be hereinafter related, it will be impossible to accidentally spring or release the parts from their engagement, all danger to the handler or operator being thus eliminated. By this means a subsidiary improvement has been evolved, it resting in the fact that when the operative parts have been locked as above noted, two traps of like size may be safely packed for shipment, storage, or display, in a lesser space than was formerly required for one.

A further object is to provide a novel means for, and method of mounting and assembling the several parts of the trap.

A still further object is to provide a construction in which either wood or metal, or both, may be used for the base or frame.

A still further object is to provide a novel tripping lever which while performing its usual function will further retain the bait or lure in place without penetrating it.

Other objects of the invention consist in novel structural features and combinations of devices, the operation of which devices separately and in combination will be found hereinafter described and set forth in the claims hereto appended.

Mechanism showing the structural features, arrangement, connection and mutual relationship of the several parts of my improvement is illustrated in the accompanying drawings, in which:—

Figure 2:
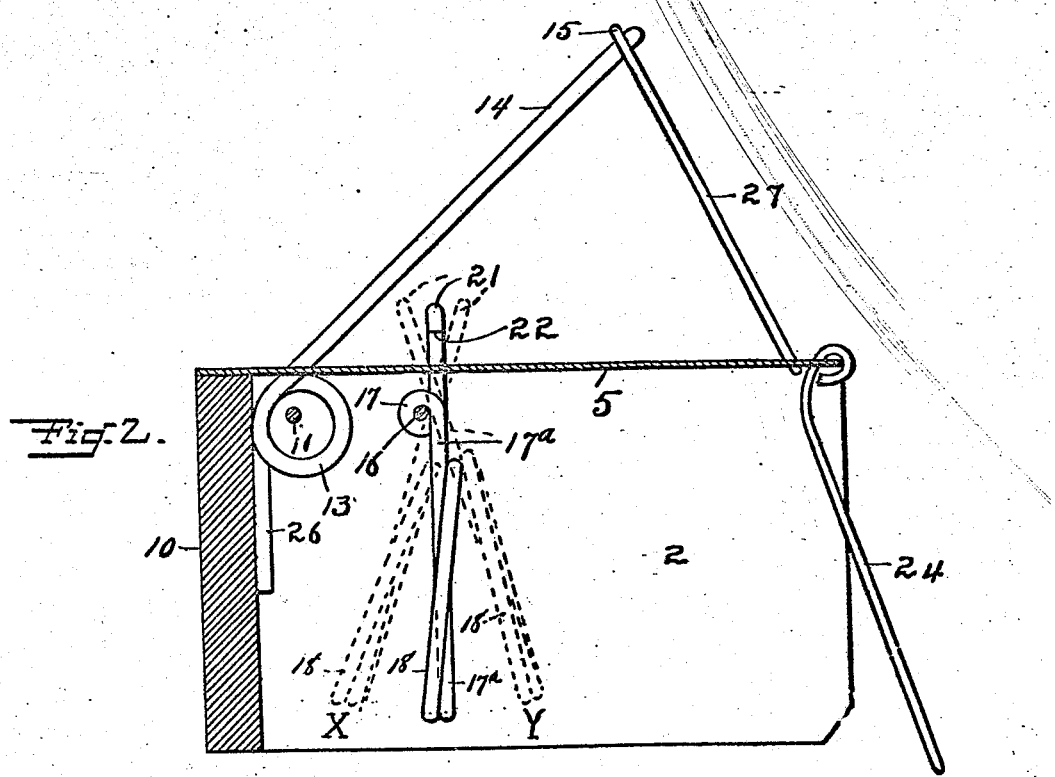

Figure 1 is a sectional elevation in the line 1—1 in Fig. 5, the parts being shown in locked position; Fig. 2, a similar view, the parts shown as in released or sprung position; Fig. 3, a rear elevation, partly broken away, the parts in set position; Fig. 4, a front elevation, the parts in locked engagement; Fig. 5, a plan, the parts shown in locked engagement by full lines, and in set position by dot lines; and Figs. 6 and 7, detail perspectives showing respectively the locked and set positions of the engaging devices.

Attention being directed to said drawings and to the numerals of reference thereon, the same one indicating the same part in each of the several figures thereof, 1 indicates a frame, which, as shown, is constructed of sheet metal and comprises supporting sides 2, each of which is provided with apertures 3 and 4, and a base or top 5 provided with slots 6 for the reception and passage of the arms of the jaw, a longitudinally disposed slot 7 for the extended or pendulous end of the actuating spring, a slot 8 through which the rising end of the tripping lever is directed, and an opening 9 at its median front portion for the latch or locking bar. A block of wood 10 is set into the rear portion of the frame and serves to strengthen and give form to the metallic parts, as well as to constitute a means against which the fixed or stationary end of the spring takes.

A rod 11 is seated in the registering apertures 3 and projects through the coils 13 of the actuating spring, one (the stationary) end, 26 of which takes against and is held from movement by the end 10, its forward end being projected through the slot 7 and bent into a triangular hook 14 with which the eyed ends 15 of a substantially U-shaped jaw 27 are engaged.

Seated in the registering orifices 4 is a rod or shaft 16 on which is loosely hung the coiled midlength portion 17 of the trigger or tripping lever, the depending member 17ª of which extends to a depth nearly corresponding with the lowermost portions of the sides 2 and end 10 and is thence formed into a ring-like tripping member 18, the end of the wire being extended past the initial bend and is adapted to be sprung laterally thereof, whereby a yielding spring bait holder 23 is created. The rising member 20 is projected through the slot 8 and reversed and bent downwardly to form a locking hook 21, the point 22 only of which is employed in setting the trap for operation. Although the term "locked" has heretofore been frequently employed in specifications to indicate the set or operative position of a trap, I wish to herein clearly differentiate the terms "locked" and "set". The looped end of a latch or locking bar 24 is hinged on the cross-piece 25 at the front of the top, its main portion extended rearwardly and its end 29 slightly flattened and bent at a right angle to the main portion for a purpose presently described.

The parts being in the relative positions shown at Fig. 2, or released, and it being desired to engage them in set position or position for operation, the operator will depress the triangular end 14 of the spring and thereby the jaw and bring the latch rearwardly over the transverse bar of said triangle. This movement will be continued until the transverse end 29 of the latch is sufficiently depressed to pass beneath the point 22 of the hook at the upper end of the tripping-lever, whereupon said point is brought over into the position shown best at Figs. 3 and 7, in which position it rests lightly on the flattened portion of said latch, sufficiently, however, to hold the parts in that position until an animal, as a gopher, contacts the tripping member 18 and forces it rearwardly as shown at the dot line position X, Fig. 2, or until a rat attempts to escape with the bait (not shown) which is held between the members of the tripping lever which constitute the bait holder 23, and pulls said member to the dot line position indicated by Y, same figure, thus releasing said parts 22 and 29 from their engagement. The coil spring will then act and by reason of its engagement with the jaw will throw the latter upwardly and trap the animal in an evident manner. The force exerted by the spring is generally sufficient to cause the death of the animal, but in the event of this not occurring, he will be sustained above the ground and unable to escape. It will be evident that the trap is to be baited only when set for rats or the like. When set for gophers a small portion of the dirt is removed from the outlet to his tunnel, and the front end of the trap is so placed therein that the tunnel opening will be directly in line with the open end of the trap. The latter is preferably covered with loose soil to exclude the light, it being evident that it will in no wise interfere with the operation of the trap.

When it is desired to lock the trap in position for storage, shipment or display, or to prevent injury to careless persons or children, the hook 21 is passed to stride the longitudinal portion of the latch as shown best at Figs. 1, 4, 5 and 6. In this position it will be impossible to accidentally spring the trap, because the spring forces the latch against the hook, and the latter is prevented slipping longitudinally therefrom by the bent end 29 thereof.

I have hereinbefore stated that when packed for shipment etc. two traps constructed as above would occupy less space than one of any similar construction and size heretofore known. It will be evident that it has been and is unsafe to ship traps set in position for operation. They were therefore shipped in the loose position shown at Fig. 2. In packing my improved trap for shipment I place them rear end to front end, their open bottoms telescoping within each other and the locking members engaged, in which positions they will occupy a space less than that occupied by an unset trap of prior construction.

The principal figures of the drawings show and are made to the same scale and measurement of a full sized trap.

Having thus described my invention and set forth its objects, purposes and advantages, I claim as new and desire to secure by Letters Patent the following, namely:

1. The combination with means on which they are mounted, of a spring actuated jaw, a tripping lever including an inverted U-shaped engaging end, and a longitudinally disposed hinged latch having its free end bent substantially at a right angle to its main portion.

2. In a trap, in combination, a spring actuated jaw, a longitudinally disposed hinged latch, its free end bent at a right angle to its main portion, and a tripping lever including an arciform upper end, the extremity thereof adapted to engage the aforesaid bent end portion of the latch to hold the trap in set position, and the arciform portion adapted to straddle the main portion of the latch to hold it locked.

3. In a trap, in combination, a spring, a jaw actuated thereby, a longitudinally disposed hinged latch, its end bent at a right angle to its main portion, and a tripping lever including a hooked upper end, the extremity thereof adapted to engage the aforesaid bent end portion of the latch to set the trap, and the bow of the hook to straddle the main portion of the latch to lock it.

4. In a trap, in combination, a spring actuated jaw, a hinged latch adapted to restrain it, the free end of the latch being substantially at a right angle to its main portion, and a tripping lever having an inverted U-shaped upper end adapted for selective engagements with the latch.

5. In a trap, a spring actuated jaw, a latch adapted to restrain it, and a tripping lever having an inverted U-shaped end adapted for engagement therewith, the latch including means whereby either locking or setting engagement may be effected.

6. In a trap, a base, a spring actuated jaw, a hinged latch adapted to extend longitudinally of the base, its rear end bent substantially at a right angle to its main portion, and a pivoted tripping lever, its upper portion bent over into inverted U-shape, whereby selective engagements with the latch may be effected.

7. In a trap, a base, a spring actuated jaw, a hinged latch adapted to extend longitudinally of the base, its rear end bent substantially at a right angle to its main portion, and a tripping lever pivoted to the base and extending therethrough, its upper portion bent over and its point adapted to rest on the transverse portion of the locking bar.

8. In a trap, a spring actuated jaw, a hinged latch adapted to extend longitudinally of the base, its rear end bent substantially at a right angle to its main portion, and a pivoted tripping lever, its upper end bent into a hook adapted to rest on the main portion of the latch in one position, and its point adapted to rest on the transverse member of the latch in another position.

9. In a trap, an apertured base having depending sides, a rod fixed transversely thereof, a spring mounted thereon beneath said base, one of its ends projected through a slot therein, a U-shaped jaw, its limbs passed through apertures in the base and engaged with said projected end of the spring, and means whereby the trap may be held in set position.

10 In a trap, an apertured base having depending sides, a rod fixed transversely thereof, a spring mounted thereon beneath said base, one of its ends projected through a slot in the base, a U-shaped jaw, its limbs passed through apertures in the base and engaged with said projected ends of the spring, a latch whereby the trap may be held in set position, and means adapted to be engaged with said latch and to be tripped by an animal.

11. A trap including an apertured base and depending sides, a rod fixed transversely thereof, a spring mounted thereon, one of its ends projected through one of said apertures, a U-shaped jaw, its limbs passed through other apertures in the base and engaged with said end of the spring, a pivotally mounted tripping lever, and a latch hinged to the base and adapted for engagement with the tripping lever.

12. The combination with means on which they are mounted, of a spring actuated jaw, a longitudinally disposed hinged latch adapted to restrain and release it, the free end thereof bent substantially at a right angle to its main portion, and a tripping lever having an inverted U-shaped end adapted for engagement with the latch, whereby in one position the jaw will be held in set engagement and in another position it will be locked.

13. In a trap, an apertured base having depending sides, a rod fixed transversely thereof, a spring mounted thereon beneath the base, one of its ends projected through a slot therein, and a U-shaped jaw, its arms passed through apertures in the base and engaged with said projected end of the spring.

14. A trap comprising an apertured base and depending sides, a rod fixed transversely thereof beneath the base, a coil spring mounted thereon, one of its ends projected through an aperture in the base, a U-shaped jaw, its limbs passed through other apertures in the base and engaged with said end of the spring, a second rod fixed similarly to the first recited one, a tripping lever mounted thereon, and a latch hinged to the base and its free end adapted for engagement with the tripping lever.

15. A trap including a hinged latch having its free end bent at an angle to its main portion, and a pivoted tripping lever having the extremity of its engaging end reversed, said lever adapted for selective engagements with the latch.

16. A trap including a hinged latch having its free end bent at an angle to its main portion, and a pivoted tripping lever having an inverted-U-shaped engaging end adapted for selective engagements therewith.

17. In a trap, in combination, a spring actuated jaw, a hinged latch having its free end bent at an angle to its main portion, and a tripping lever having its engaging end reversed and adapted for selective engagements with the latch.

18. In a trap, a base, a jaw, and a coil spring, the coils being located beneath the base, one of its ends projected therethrough, engaged with and adapted to actuate said jaw.

19. A trap including a base, a spring actuated jaw, a hinged latch having its free end bent at an angle to its main portion, and a tripping lever having a portion bent backwardly and adapted to rest entirely over said main portion of the latch, whereby the parts are held in locked position.

In witness that I claim the foregoing as my invention I have hereunto affixed my signature at Galesburg, Knox county, Illinois, this 22" day of November, 1907.

WILLIAM CHAUNCEY HOOKER.

Witnesses:
MYRLE NORTON,
H. M. RICHARDS.